United States Patent [19]

Gustafsson

[11] Patent Number: 5,279,383

[45] Date of Patent: Jan. 18, 1994

[54] SPRING SUSPENSION DEVICE

[75] Inventor: Leif Gustafsson, Holmsjo, Sweden

[73] Assignee: Ohlins Racing AB, Upplands Vasby, Sweden

[21] Appl. No.: 947,496

[22] Filed: Sep. 18, 1992

[30] Foreign Application Priority Data

Mar. 20, 1990 [SE] Sweden ............................. 9000985
Mar. 20, 1991 [SE] Sweden ............ PCT/SE91/00214

[51] Int. Cl.$^5$ ................................................ B62K 11/00
[52] U.S. Cl. ................................. 180/227; 180/219; 280/283; 267/47
[58] Field of Search ............... 180/219, 227; 280/284, 280/285, 283; 267/47

[56] References Cited

U.S. PATENT DOCUMENTS

| | | | |
|---|---|---|---|
| 709,718 | 9/1902 | Monahan . | |
| 1,029,771 | 6/1912 | Stephenson . | |
| 1,154,821 | 9/1915 | Whiting | 180/227 X |
| 1,261,440 | 4/1918 | Rigby | 280/284 |
| 1,306,995 | 6/1919 | Bradshaw | 180/227 X |
| 4,583,612 | 4/1986 | Parker | 180/227 |
| 4,732,404 | 3/1988 | Coetzee | 280/283 |
| 4,972,920 | 11/1990 | Zamitter et al. | 180/227 |

FOREIGN PATENT DOCUMENTS

| 4038288 | 2/1992 | Japan | 180/227 |
|---|---|---|---|
| 2109320 | 6/1983 | United Kingdom . | |

Primary Examiner—Margaret A. Focarino
Assistant Examiner—C. Mattix
Attorney, Agent, or Firm—Ernest A. Beutler

[57] ABSTRACT

A suspension in a motorcycle or similar vehicle having a frame relative to which a rear fork with a rear wheel is moveable. The suspension is characterized by an elongated composite spring mounted at the front end on the lower front part of the frame and loaded at the rear end by one end of a link member the other end of which is mounted on the rear fork. The frame is provided on its underside with at least one deflecting member which is arranged in such a manner that it bears against the composite spring upon a relative low loading of the rear fork relative to the frame to change the spring rate.

20 Claims, 1 Drawing Sheet

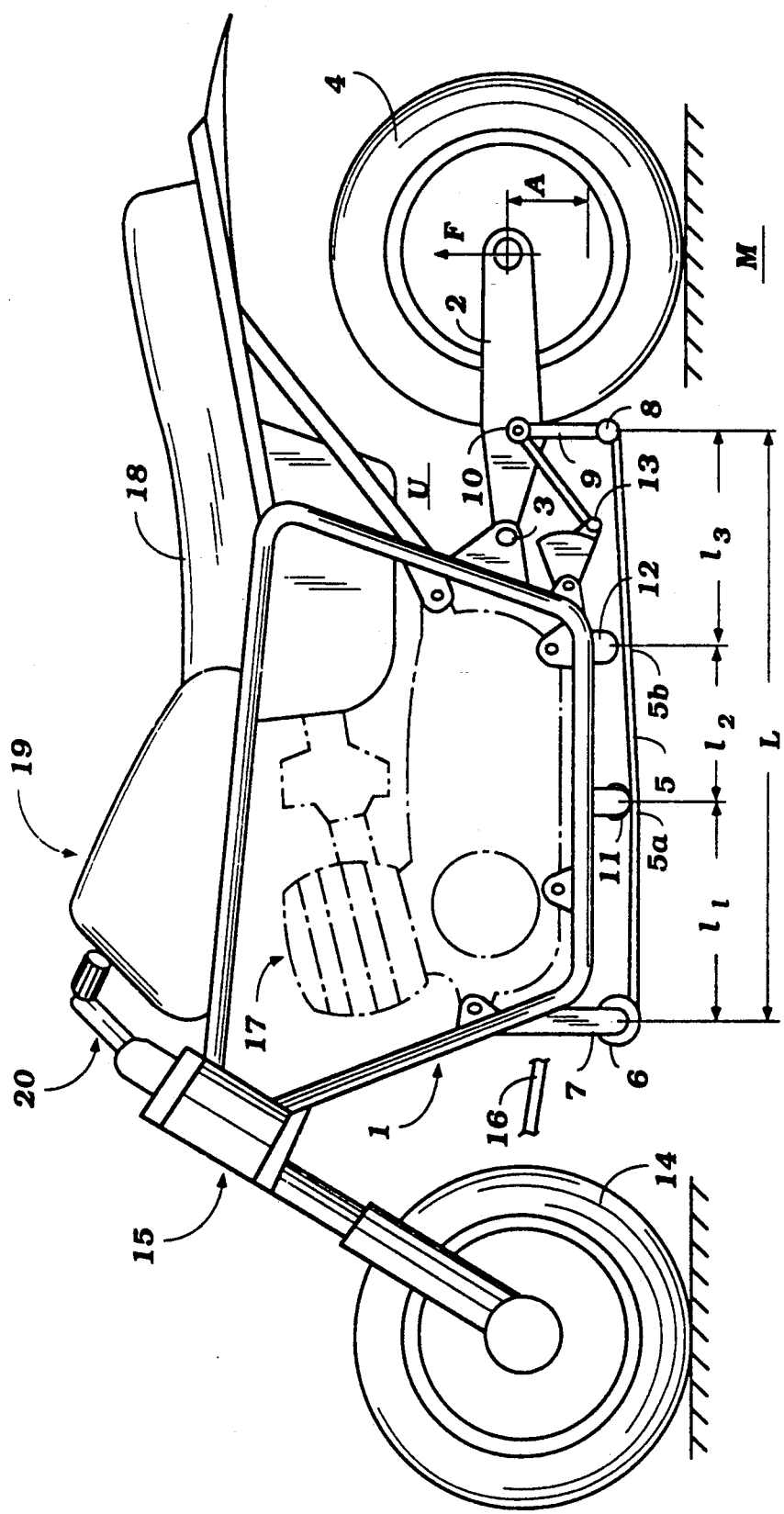

SPRING SUSPENSION DEVICE

BACKGROUND OF THE INVENTION

The present invention relates to a spring suspension device between frame part or chassis part and wheel-bearing part of a vehicle, for example a motorcycle. In this connection, a vehicle is intended, in which the suspension of the bearing part relative to the frame/chassis is dependent upon the loading of the wheel or wheels which are arranged in the bearing part. The invention relates inter alia to a spring suspension device in a motorcycle or similar vehicle, which comprises a frame, relative to which a rear fork bearing a rear wheel is rotatably mounted.

Spring suspension devices of said type have been in existence for a long time in a great number of variants, usually in combination with some form of shock absorption. Helical springs made of metal with hydraulic shock absorbers can be considered as standard in this connection, but torsion suspension has also been proposed.

Said constructions, in general, function well under ordinary conditions of use, that is to say driving on normal roads. If greater demands are made, however, for example in competitions over country terrain with a motorcycle, there are such great demands for suspension characteristics adapted to the weight and driving style of the rider and the nature of the terrain that the abovementioned constructions do not meet the demands.

The object of the invention is therefore to bring about a suspension of the type mentioned in the introduction, which results in a low centre of gravity on the vehicle, especially the motorcycle. Moreover, the suspension is also to be able to exhibit low weight and simple construction and permit simple adjustability of a wide range of suspension characteristics.

The invention is also to be able to operate effectively in interaction with the shock absorption function so that space-saving arrangements can be designed. It is especially important in the case of motorcycles that the space behind the frame and in front of the rear wheel can be divided for accessory equipment (tank, battery etc.).

The suspension and shock absorber device is also to be able to contribute to easier and more adaptable frame construction since it is possible to reduce the material in the frame.

SUMMARY OF THE INVENTION

The invention solves these problems inter alia and proposes the arrangement of an elongated plate spring connected to the frame part and chassis part and the wheel-bearing part. Moreover, one or more members, so-called deflecting members, are arranged on the parts and these members enter respectively into interaction with the spring at different degrees of loading of the rear wheel and an interaction between the respective member and the spring results in the latter coming to work with a spring constant corresponding to the interaction. The spring thus comes to work with a number of spring constants corresponding to the number of members. The shorter the spring excursion between deflecting member and the wheel-bearing part, the higher the spring constant, and vice-versa.

In embodiments of the inventive idea, different designs are proposed for the respective deflecting member which can be made with a spherical shape or other curved shape which can interact with the spring part in question and on which, during the suspension function, the spring rolls and gives different spring constants.

According to one embodiment of the invention, a spring suspension device is characterised by an elongated composite spring, flexibly mounted at a front end on a first guide shaft fastened to the lower, front part of the frame, further flexibly mounted at a rear end on a second guide shaft in one end of a link member, the link member being at its other end flexibly mounted on said rear fork on a third quide shaft, and the frame is provided on its underside with at least a first deflecting member which is arranged at a distance from the first guide shaft in such a manner that it bears against the composite spring upon a first relatively low loading of the rear fork relative to the frame. The low loading can, for example, be caused by the dead weight of the vehicle.

In addition to the first deflecting member, a second deflecting member can also be arranged on the underside of the frame at a distance from the first deflecting member in such a manner that it bears against the composite spring only upon a loading of the rear fork relative to the frame, which is considerably greater than said first loading.

There can even be a number of deflecting members, according to the suspension characteristics desired. In one embodiment, the deflecting members consist of rollers which are rotatable about shafts which are directed horizontally transversely to the longitudinal direction of the composite spring. In order to bring about increased adaptation according to demands for individual suspension, the fastening of the deflecting members can be designed in such a manner that the height position and longitudinal displacement position of the deflecting members relative to the frame are adjustable. In an alternative embodiment of the suspension according to the invention, the first deflecting member is designed with such a surface, turned towards the composite spring, that upon increasing loading of the rear axle relative to the frame, an ever greater part of the surface bears against the composite spring. In a further embodiment, elastic material is included in the respective deflecting member in order to make possible a smooth transition from one spring constant to another. The spring constant is thus changed continuously or discontinuously by means of the interaction with the deflecting member(s).

The spring can be flexibly fastened at its one end and loosely (longitudinally displaceably) mounted at its other end. The spring can also in principle be mounted on two wheel-bearing parts via its respective ends. The spring is arranged in the longitudinal direction of the vehicle in a motorcycle or two-wheeled vehicle and preferably in the transverse direction in a car (four-wheeled vehicle). In the case of fastening to two wheel-bearing parts, for example front and rear wheel of a motorcycle, there is one deflecting member or two symmetrically arranged groups of deflecting members (one group for each wheel). Each group can comprise one or more deflecting members and the groups can share the central deflecting member. In one embodiment, the spring can be fastened directly in the wheel-bearing part.

The damping arrangement to be used in combination with this suspension can be of different types and be mounted in different positions, so that the relative movement between frame and rear axle is damped. Conventional hydraulic dampers mounted between the frame and the rear fork are a possible construction. A damper of the type which is referred to in U.S. Pat. No. 4,773,514 has proved to be especially suitable in this connection. This damper comprises a sector-shaped oil-filled housing, in which a vane is rotatable about a shaft projecting out from the housing. Channels are arranged for overflow of oil from one part of the housing to the other part of the same upon rotation of the shaft in relation to the housing, the vane driving oil through these channels. The vane is fixed via a link in an articulation point to the bearing part. The vane works in the essentially vertical plane of the vehicle and is situated under the wheel-bearing part.

By means of the invention, a simple and effective suspension function is made possible, which can in an advantageous manner be built together with a damping function so that said space-saving and dimension reduction (in the frame) can be brought about in, for example, motorcycles. This is achieved by virtue of the fact that a force-absorbing arrangement can be installed on the lower parts of the vehicle and makes it possible that the space (U) directly under the saddle becomes free for accessory equipment. The change in the suspension for different degrees of loading on the wheel in question can be made stepless. The device can be made with low weight if so desired by means of the use of a composite spring.

BRIEF DESCRIPTION OF THE DRAWING

A presently proposed embodiment which has the parts which are characteristic of the invention will be described below with simultaneous reference to the FIGURE which shows parts of a motorcycle from the side.

DETAILED DESCRIPTION OF THE PREFERRED EMBODIMENT

In the FIGURE, the frame of a motorcycle is indicated by 1. In this, a rear fork 2 is rotatably mounted in a bearing 3 and bears a rear wheel 4 which is subject to a load F.

An elongated composite spring 5 (can in certain cases consist of a steel spring or a spring made of another material) is flexibly mounted at a front end on a first guide shaft 6 which is fixed to the lower part of the frame in a stay 7 which is arranged vertically adjustably in relation to the frame. At its rear end, the composite spring is flexibly mounted on a second guide shaft 8 in one end of a link member 9. This link member 9 is at its other end flexibly mounted on a third guide shaft 10 on the rear fork 2. On the underside of the frame, at a distance from the first guide shaft 6, a first deflecting member 11 in the form of a roller is arranged, which is rotatable about a shaft directed horizontally transversely to the longitudinal direction of the composite spring. This shaft and its bearing can be fixed vertically in relation to the frame 1, but can also be vertically adjustable. A second deflecting member 12, also in the form of a roller, rotatable about a shaft and mounted in the same manner as is the case for the first deflecting member, is arranged on the underside of the frame at a still greater distance from the first guide shaft 6, so that the composite spring only bears against this roller upon considerably greater loading than that which brings the first deflecting member to bear against the composite spring.

As indicated above, the damping can be arranged in different ways and is here shown diagrammatically as a damper of the type which is described in U.S. Pat. No. 4,773,514, working between the frame 1 and the rear fork 2. It is indicated by 13.

The spring characteristics can be varied by adjustment of the height positions of the deflecting members 11, 12 in relation to the frame 1. As already mentioned, the front bearing of the composite spring 5 on a first guide shaft 6 can also be vertically adjustable.

The deflecting members can be made of elastic material and can, for example, consist of polyurethane, rubber etc. Fastening to the frame can be carried out by means of nuts and screws and longitudinal slots which make possible adjustability in the longitudinal direction of the frame. The height-adjustability can in this case be effected by means of selection of different heights of the members.

The extension of the spring 5 can vary and, for example, run inside or at the side of the frame 1. In one exemplary embodiment, the spring can be associated with the mounting 15 of the front wheel 14. This association is symbolised by 16, the extension above the lower parts of the frame 1 being clear.

Either of the bearing points 6 and 8 can be replaced by a sliding bearing, universal bearing etc., possibly supplemented by a sliding bearing on the central parts of the frame, for example in the position for the deflecting member 11 which can then be displaced. In the case of wheel-bearing parts on a car, the spring extends in the transverse direction of the car and is mounted via its ends on the wheel-bearing parts/swinging brackets via links. A shock absorber 13 is in this connection arranged on each bearing part. The deflecting members are preferably arranged in the chassis in two symmetrical groups which each serve their bearing part. The deflecting members interact with the spring from its central part and outwards. The spring in the case shown functions only in the suspension function (not the mounting function). The spring can alternatively consist of a steel spring.

In the figure, the engine block, gearbox etc. have been indicated by 17, a saddle by 18, a tank by 19 and handlebars by 20. A distance which symbolises the distance between the lower part of the frame and the centre of the mounting of the rear wheel 4 has been shown by A. M indicates a ground support. A space above the damper 13 and the swinging bracket fastening 3 is indicated by U.

In the figure, the length of the spring has been indicated by L and the distances between the ends of the spring and each deflecting point by 11 and 13 respectively. A distance between the deflecting points has been indicated by 12. A spring constant K1 on account of the spring bearing via the part 5a against the member $11 = L/L - 11$. A spring constant K2 on account of the spring bearing via the part 5b against the member $12 = L/L - (11 + 12)$.

The invention is not limited to the embodiment shown above but can be subjected to modifications within the scope of the inventive idea and following claims.

I claim:

1. A wheel suspension for a vehicle comprising a wheel journaling member rotatably journaling a vehicle wheel, a leaf spring, means for loading a first portion of said leaf spring upon suspension movement of said wheel journaling member, means for fixing a second portion of said leaf spring relative to said vehicle, and at least one abutment fixed relative to said vehicle at a point to contact said spring between said first and said second portions upon a predetermined deflection of said leaf spring caused by a first amount of movement of said wheel journaling member for causing said leaf spring to deflect about said abutment upon further suspension travel of said wheel journaling member.

2. A wheel suspension as set forth in claim 1 wherein there are a plurality of abutments fixed relative to the vehicle at points to contact the leaf spring between the first and second portions.

3. A wheel suspension as set forth in claim 2 wherein the abutments are each disposed so as to progressively engage the leaf spring as it deflects for decreasing its effective length progressively upon increased deflection.

4. A wheel suspension as set forth in claim 1 wherein the abutment is adjustably supported relative to the vehicle.

5. A wheel suspension as set forth in claim 4 wherein the adjustment of the abutment is effective to change the distance the spring must deflect before it engages the abutment.

6. A wheel suspension as set forth in claim 5 wherein the abutment is adjustable longitudinally relative to the leaf spring.

7. A wheel suspension as set forth in claim 6 wherein the abutment is adjustable both longitudinally and vertically relative to the vehicle and the leaf spring.

8. A wheel suspension as set forth in claim 4 wherein there are a plurality of abutments fixed relative to the vehicle at points to contact the leaf spring between the first and second portions.

9. A wheel suspension as set forth in claim 8 wherein all of the abutments are adjustable relative to the vehicle.

10. A wheel suspension as set forth in claim 1 wherein the abutment comprises a roller rotatable about an axis transverse to the longitudinal axis of the leaf spring.

11. A wheel suspension as set forth in claim 1 wherein the abutment comprises an elastic member.

12. A wheel suspension as set forth in claim 1 wherein the vehicle comprises a frame having an elongated frame member and wherein the wheel journaling member comprises a suspension arm pivotally supported at one end on said frame and carrying a wheel at its other end.

13. A wheel suspension as set forth in claim 12 wherein the means for loading the first portion of the leaf spring comprises a link pivotally connected to the leaf spring and the suspension arm.

14. A wheel suspension as set forth in claim 12 wherein the means for fixing the second portion of the leaf spring relative to the vehicle affixes the second portion of the leaf spring to the elongated frame member at a point spaced from the wheel and the pivotal support for the suspension arm.

15. A wheel suspension as set forth in claim 14 further including a second wheel carried by the frame and disposed at the other end of the elongated frame member from the first mentioned wheel.

16. A wheel suspension as set forth in claim 15 wherein the vehicle comprises a motor cycle and at least one of the wheels is dirigible.

17. A motorcycle suspension arrangement comprising a frame having an elongated lower frame member, a front wheel supported by said frame at one end of said elongated frame member, a rear wheel supported by said frame at the other end of said elongated frame member, means for suspending one of said wheels from said frame comprising a suspension arm pivotally connected at one end to said frame contiguous to one end of said elongated frame member and rotatably journaling one of said wheels at its other end, an elongated leaf spring lying beneath said elongated frame member and connected at one of its ends to the elongated frame member at a point spaced from said one end and connected at its other end to said suspension arm for loading said leaf spring upon movement of the wheel suspended by said suspension arm.

18. A motorcycle suspension as set forth in claim 17 further including an abutment fixed to said elongated frame member and adapted to engage said leaf spring upon its deflection for changing the rate of said leaf spring.

19. A motorcycle suspension as set forth in claim 18 wherein there are a plurality of abutments each adapted to be successively engaged by the leaf spring upon its deflection for progressively decreasing the length of said leaf spring which deflects as said suspension arm pivots.

20. A motorcycle suspension as set forth in claim 19 wherein the suspended wheel is the rear wheel.

* * * * *